US008217925B2

(12) United States Patent
Nishimura

(10) Patent No.: US 8,217,925 B2
(45) Date of Patent: Jul. 10, 2012

(54) DISPLAY PANEL DRIVER AND DISPLAY DEVICE

(75) Inventor: Kouichi Nishimura, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 334 days.

(21) Appl. No.: 12/461,112

(22) Filed: Jul. 31, 2009

(65) Prior Publication Data

US 2009/0303210 A1 Dec. 10, 2009

(30) Foreign Application Priority Data

Aug. 6, 2008 (JP) ................................ 2008-202637

(51) Int. Cl.
*G06F 3/038* (2006.01)

(52) U.S. Cl. ...................................... 345/204; 330/255

(58) Field of Classification Search .................. 345/204; 330/9, 51, 255

See application file for complete search history.

(56) References Cited

U.S. PATENT DOCUMENTS

| | | | | |
|---|---|---|---|---|
| 5,847,607 | A * | 12/1998 | Lewicki et al. | 330/258 |
| 5,959,475 | A * | 9/1999 | Zomorrodi | 327/112 |
| 6,424,219 | B1 * | 7/2002 | Kato | 330/255 |
| 6,538,502 | B2 * | 3/2003 | Nair et al. | 330/9 |
| 7,075,342 | B2 * | 7/2006 | Nishimura | 327/108 |
| 7,126,415 | B2 * | 10/2006 | Maloberti et al. | 330/9 |
| 7,298,183 | B2 * | 11/2007 | Mirzaei et al. | 327/115 |

FOREIGN PATENT DOCUMENTS

| | | |
|---|---|---|
| JP | 57-69911 | 4/1982 |
| JP | 3-286606 | 12/1991 |
| JP | 2000-13152 | 1/2000 |
| JP | 2002-175052 | 6/2002 |
| JP | 2003-158427 | 5/2003 |

OTHER PUBLICATIONS

Japanese Office Action dated Feb. 5, 2010 with partial English translation thereof.

Japanese Office Action dated Apr. 14, 2010, with English translation.

* cited by examiner

*Primary Examiner* — Nitin Patel
*Assistant Examiner* — Towfiq Elahi
(74) *Attorney, Agent, or Firm* — McGinn IP Law Group, PLLC

(57) ABSTRACT

Provided is a display panel driver with an improved driving characteristic by use of an amplifier output having excellent symmetry of an output characteristic. The display panel driver according to the present invention includes a first input differential stage circuit, a first output stage circuit, a second output stage circuit, and a first switch circuit. The first input differential stage circuit outputs two first input stage output signals according to one of a positive voltage and a negative voltage. The first switch circuit selects one of the first and second output stage circuits, and connects the selected circuit to the first input differential stage circuit. The output stage circuit connected to the first input differential stage circuit outputs a single-ended signal based on the two first input stage output signals from the first input differential stage circuit.

12 Claims, 9 Drawing Sheets

DISPLAY PANEL DRIVER AND DISPLAY DEVICE

BACKGROUND OF THE INVENTION

1. Field of the Invention

The present invention relates to a display panel driver and a display device including the display panel driver.

2. Description of the Related Art

Nowadays, thin flat display panels are increasing in size. In the field of television, particularly, even a liquid crystal panel exceeding 100-inch is present. This trend is considered to continue in the future. On the other hand, with the increase in size of liquid crystal panel, loads on data lines of TFT_LCD (Thin Film Transistor Liquid Crystal Display) are increased. Accordingly, an electric energy consumed by an amplifier of an LCD driver which drives TFT_LCD tends to increase.

With a view to reducing the number of LCD drivers used, the number of outputs from one chip is increased. Accordingly, the power consumption of one chip is increased, and thus the power consumption of the entire LCD driver is increased. The increase in the power consumption causes a problem that a temperature of the chip becomes abnormally high.

For this reason, a technique to reduce the power consumption in the LCD driver is required. In particular, a large number of amplifiers (operational amplifiers) are used in the LCD driver. Accordingly, if the power consumption in the amplifiers is reduced, the power consumption in the entire LCD driver can be greatly reduced.

For example, Japanese Patent Application Publication No. 2002-175052 describes an operational amplifier intended to reduce power consumption. Referring to FIGS. 1 to 3, an operational amplifier according to a conventional technique is described. FIG. 1 is a view showing the configuration of an operational amplifier circuit according to a conventional technique.

As shown in FIG. 1, the operational amplifier circuit according to the conventional technique includes differential input stage circuits 140, 240 supplied with a positive power supply voltage (VDD) and a negative power supply voltage (VSS), driving stage circuits 130, 230, switch circuits 30, 40, 50, 60, PMOS transistors MP180, MP280, and NMOS transistors MN180, MN280.

The driving stage circuit 130 is connected to an output terminal 110 via drains of the PMOS transistor MP180 and the NMOS transistor MN180. Similarly, the driving stage circuit 230 is connected to an output terminal 210 via drains of the PMOS transistor MP280 and the NMOS transistor MN280. The positive power supply voltage VDD is supplied to a, source of the PMOS transistor MP180 and a half of the positive power supply voltage (VDD/2) is supplied to a source of the NMOS transistor MN180. In addition, a half of the positive power supply voltage (VDD/2) is supplied to a source of the PMOS transistor MP280 and the negative power supply voltage VSS is supplied to a source of the NMOS transistor MN280.

The switch circuit 30 includes switches SW301 to SW304 and controls connections of the output terminals 110, 210 with an odd-numbered terminal 310 and an even-numbered terminal 320. The switch circuit 40 includes switches SW401 to SW404 and controls connections of terminals 410, 420 with input terminals 120, 220 respectively included in the differential input stage circuits 140, 240. Here, a positive voltage INP is inputted to the terminal 410 from a positive DAC (Digital Analog Converter), and a negative voltage INN is inputted to the terminal 420 from a negative DAC. The switch circuit 50 includes switches SW501 to SW504 and controls connections of the differential input stage circuits 140, 240 with the driving stage circuits 130, 230. The switch circuit 60 includes switches SW601 to SW604 and control connections of the output terminals 110, 210 with input terminals 121, 221 respectively included in the differential input stage circuits 140, 240.

By use of the switch circuits 30 to 60, the operational amplifier circuit according to the conventional technique can change the configuration of the amplifier circuit for driving the odd-numbered terminal 310 and the even-numbered terminal 320. Specifically, the configuration is changed by switching between pattern 1 and pattern 2. Here, in pattern 1, the switches SW301, SW303, SW401, SW403, SW501, SW503, SW601, SW603 are turned on, while the switches SW302, SW304, SW402, SW404, SW502, SW504, SW602, SW604 are turned off. In pattern 2, the odd-numbered switches are turned off while the even-numbered switches are turned on. In pattern 1, the positive voltage INP from the positive DAC is inputted to the amplifier circuit formed by the differential input stage circuit 140 and the driving stage circuit 130, and an output from the output terminal 110 is outputted to the odd-numbered terminal 310 as an odd-numbered output Vodd. At this time, the negative voltage INN from the negative DAC is inputted to the amplifier circuit including the differential input stage circuit 240 and the driving stage circuit 230, and an output from the output terminal 210 is outputted to the even-numbered terminal 320 as an even-numbered output Veven. On the other hand, in pattern 2, the positive voltage INP from the positive DAC is inputted to the amplifier circuit formed by the differential input stage circuit 240 and the driving stage circuit 130, and an output from the output terminal 110 is outputted to the even-numbered terminal 320 as an even-numbered output Veven. At this time, the negative voltage INN from the negative DAC is inputted to the amplifier circuit including the differential input stage circuit 140 and the driving stage circuit 230, and an output from the output terminal 210 is outputted to the odd-numbered terminal 310 as an odd-numbered output Vodd.

The operational amplifier circuit according to the conventional technique operates as described above to drive capacitive loads connected to the odd-numbered terminal 310 and the even-numbered terminal 320. At this time, the differential input stage circuits 140, 240 and the driving stage circuits 130, 230 operate within a voltage range from the positive power supply voltage VDD to the negative power supply voltage VSS, and the PMOS transistors MP180, MP280 and the NMOS transistors MN180, MN280 (output transistors) operates respectively within a voltage range from the positive power supply voltages VDD to VDD/2, and a voltage range from VDD/2 to VSS. With this configuration, power consumption of the output stage can be reduced by about half.

FIG. 2 is a view showing the configuration of the differential input stage circuit 140 according to the conventional technique. As shown in FIG. 2, the differential input stage circuit 140 includes: PMOS transistors MP103 to MP106 whose sources are supplied with a positive power supply voltage VDD; NMOS transistors MN103, MN104 whose sources are supplied with a negative power supply voltage VSS; NMOS transistors MN101, MN102 whose sources are connected to a negative power supply (VSS) via a constant current source I101; and PMOS transistors MP101, MP102 whose sources are connected to a positive power supply (VDD) via a constant current source I102.

The PMOS transistors MP101, MP102 form a differential pair and the NMOS transistors MN103, MN104 form active loads thereof. In addition, the NMOS transistors MN101, MN102 form a differential pair. The pair of the PMOS transistors MP104, MP105 and the pair of the NMOS transistors MN104, MN105 respectively form current mirror circuits, and outputs thereof are connected to drains of the NMOS transistors MN103, MN104, respectively. Furthermore, the input terminal 120 is connected to gates of the NMOS transistor MN101 and the PMOS transistor MP101, and the input terminal 121 is connected to gates of the NMOS transistor MN102 and the PMOS transistor MP102. Also, the drains of the NMOS transistor MN104 and the PMOS transistor MP106 are connected to the switches SW501, SW502 via the terminal 123.

With the configuration described above, differential input signals inputted to the input terminals 120, 121, and are converted into a single-ended input signal. Then, the resultant input signal is outputted from the terminal 123. The differential input stage circuit 240 has a similar configuration and similarly operates. Specifically, the input terminals 120, 121, the terminal 123, the switches SW501, SW502 of the differential input stage circuit 140 are respectively read as input terminals 220, 221, a terminal 223, and switches SW503, SW504 of the differential input stage circuit 240, respectively.

FIG. 3 is a view showing the configuration of the driving stage circuit 130 according to the conventional technique. As shown in FIG. 3, the driving stage circuit 130 includes: PMOS transistors MP107 to MP109 whose sources are supplied with a positive power supply voltage VDD; a NMOS transistor MN105 and a PMOS transistor MP110 whose sources are supplied with a negative power supply voltage VSS; and constant current sources 103, 104 which are supplied with a negative power supply voltage VSS. A gate of the NMOS transistor MN105 is connected to the switches SW501, SW502 via the terminal 131, and a drain of the NMOS transistor MN105 is connected to a drain of the PMOS transistor MP107. The PMOS transistor MP107, together with each of the PMOS transistors MP108, MP109, forms a current mirror circuit. A drain of the PMOS transistor MP108 is connected to the constant current source 103 via the PMOS transistor MP110. A gate of the PMOS transistor MP110 is connected to a gate of the PMOS transistor MP180. A drain of the PMOS transistor MP109 is connected to the gate of the NMOS transistor MP180 and the constant current source 104.

With the configuration described above, the driving stage circuit 130 receives an input voltage from the terminal 131 through the N-channel MOS transistor MN105, and provides outputs to drive the PMOS transistor MP180 and the NMOS transistor MN180. That is, a composite output signal according to the input signal from the terminal 131 is outputted to the terminal 110. The driving stage circuit 230 also has a similar configuration and similarly operates. Specifically, the PMOS transistor MP180, NMOS transistor MN180, terminal 131, switches SW501, SW503 of the driving stage circuit 130 are read as a PMOS transistor MP280, NMOS transistor MN280, terminal 231, and switches SW502, SW504 of the driving stage circuit 230, respectively.

In the differential input stage circuit 140 (240), the number of transistors differs between a current path where the differential pair of the NMOS transistors MN101, MN102 operate, and a current path where the differential pair of the PMOS transistors MP101, MP102 operate. Accordingly, the symmetry of the output characteristics of the driving stage circuits 130, 230 is lost. Here, as for the symmetry of the output characteristics, symmetry is regarded as excellent when a difference between a rise time and a fall time of an output pulse is small, while the symmetry is regarded as poor when a difference between a rise time and a fall time of an output pulse is large. For example, as shown in FIG. 4, a rise time Tr1 and a fall time Tf1 of a pulse in a positive output signal OUTP outputted to the odd-numbered terminal 310 (even-numbered terminal 320) show different values. When a capacitive load is driven by an output signal with such an asymmetric pulse form, charge and discharge characteristics for the capacitive load are deteriorated. There may be a case where such an operational amplifier circuit does not satisfy the specification of the LCD driver.

In addition, a relative accuracy between the transistors constituting the current mirror circuit is added when the differential pair of the PMOS transistors MP101, MP102 operates. Consequently, an offset voltage becomes large. This may deteriorate the characteristic of deviation of the circuit, when the circuit is used as the LCD driver.

Furthermore, a difference between a drain-source voltage of the PMOS transistor M P109 in the driving stage circuit 130 and a drain-source voltage of the PMOS transistor MP209 in the driving stage circuit 230 is approximately VDD/2. Because of this voltage difference and an output resistance in a pentode region, the drain currents of the PMOS transistors MP109, MP209 take different values from each other. In other words, the driving stage circuits 130, 230 show different output characteristics from each other.

SUMMARY OF THE INVENTION

To solve the foregoing problem, the present invention employs means to be described below. The description of the technical matters constituting the means includes reference numerals and symbols used in preferred embodiments in order to clarify the correspondence relationship between the description of claims and the preferred embodiments. However, the reference numerals and symbols should not be used for limitedly interpreting the technical scope of the present invention described in claims.

A display panel driver (operational amplifier circuit (100)) according to the present invention includes a first input differential stage circuit (14), a first output stage circuit (13), a second output stage circuit (23), and a first switch circuit (5). The first input differential stage circuit (14) outputs two first input stage output signals (Vsi11, Vsi12) according to one of a positive voltage (INP) and a negative voltage (INN). The first switch circuit (5) selects one of the first and second output stage circuits (13, 23), and connects the selected output stage circuit to the first input differential stage circuit (14). The output stage circuit selectively connected to the first input differential stage circuit (14) outputs a single-ended signal based on the two first input stage output signals (Vsi11, Vsi12) from the first input differential stage circuit (14), and drives a capacitive load (70) in a display panel (902). The first switch circuit (5) switches the connection of the first input differential stage circuit (14) with the output stage circuits (13, 23) by using the input and output terminals of the two first input stage output signals as boundaries. Thus, a rise time and a fall time of the single-ended signal from the output stage circuits (13, 23) are equalized to form a pulse with excellent symmetry.

The present invention has an amplifier output with the symmetric pulse form, so that charge and discharge characteristics with respect to the capacitive load become satisfactory. Accordingly, it is preferable that the operational amplifier circuit (100) according to the present invention be mounted on the driver for driving the capacitive load (pixel capacity) on a display panel.

The present invention can improve the driving characteristic of the display panel driver by use of the amplifier output with excellent symmetry of the output characteristic.

DETAILED DESCRIPTION OF THE PREFERRED EMBODIMENT

Figure 1:
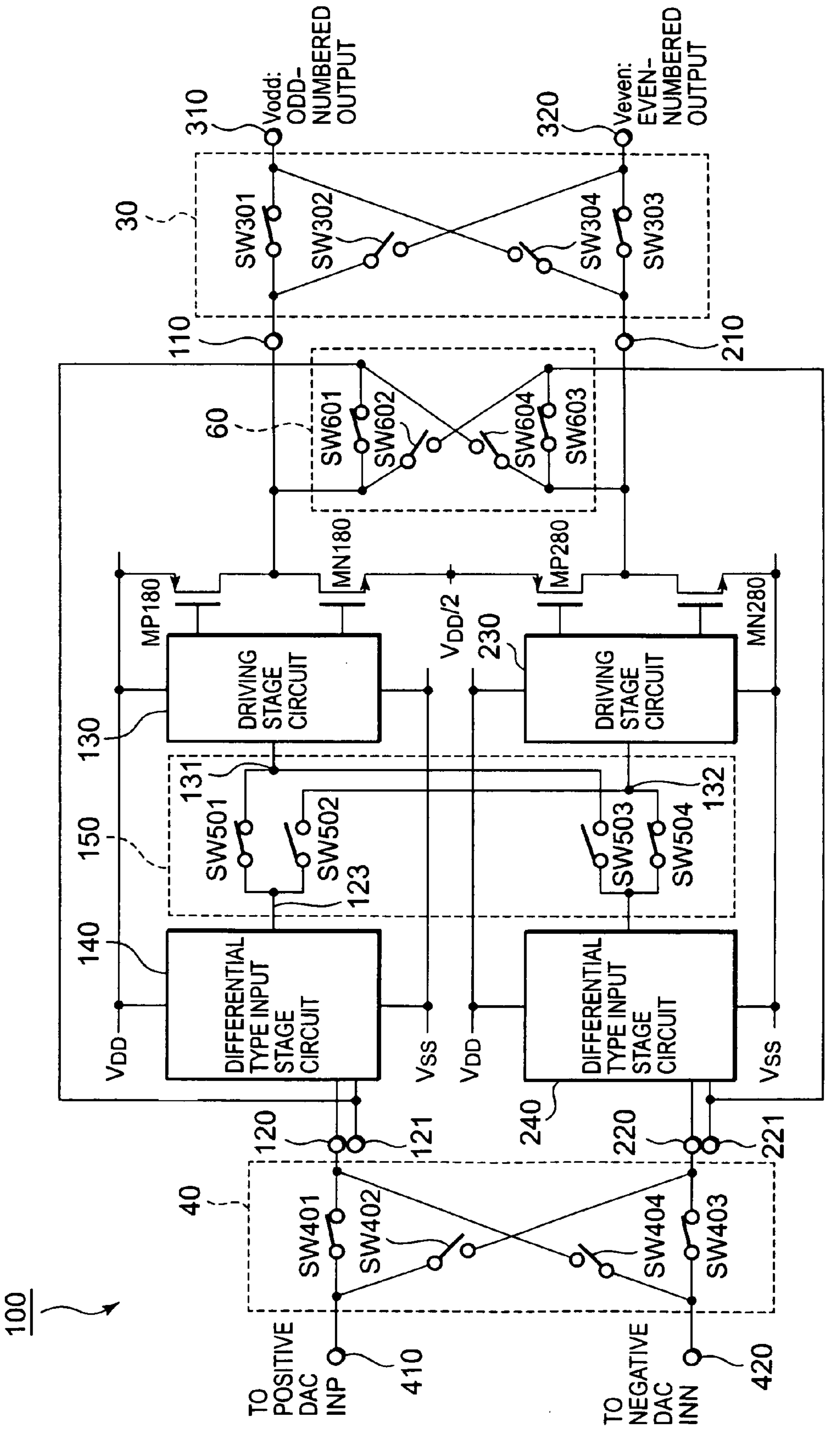
FIG. 1 is a circuit diagram showing the configuration of an operational amplifier circuit according to a conventional technique.

A preferred embodiment of the present invention is described below with reference to the accompanying drawings. In the drawings, the same or similar reference numerals denote the same, similar, or equivalent components.

Figure 5:
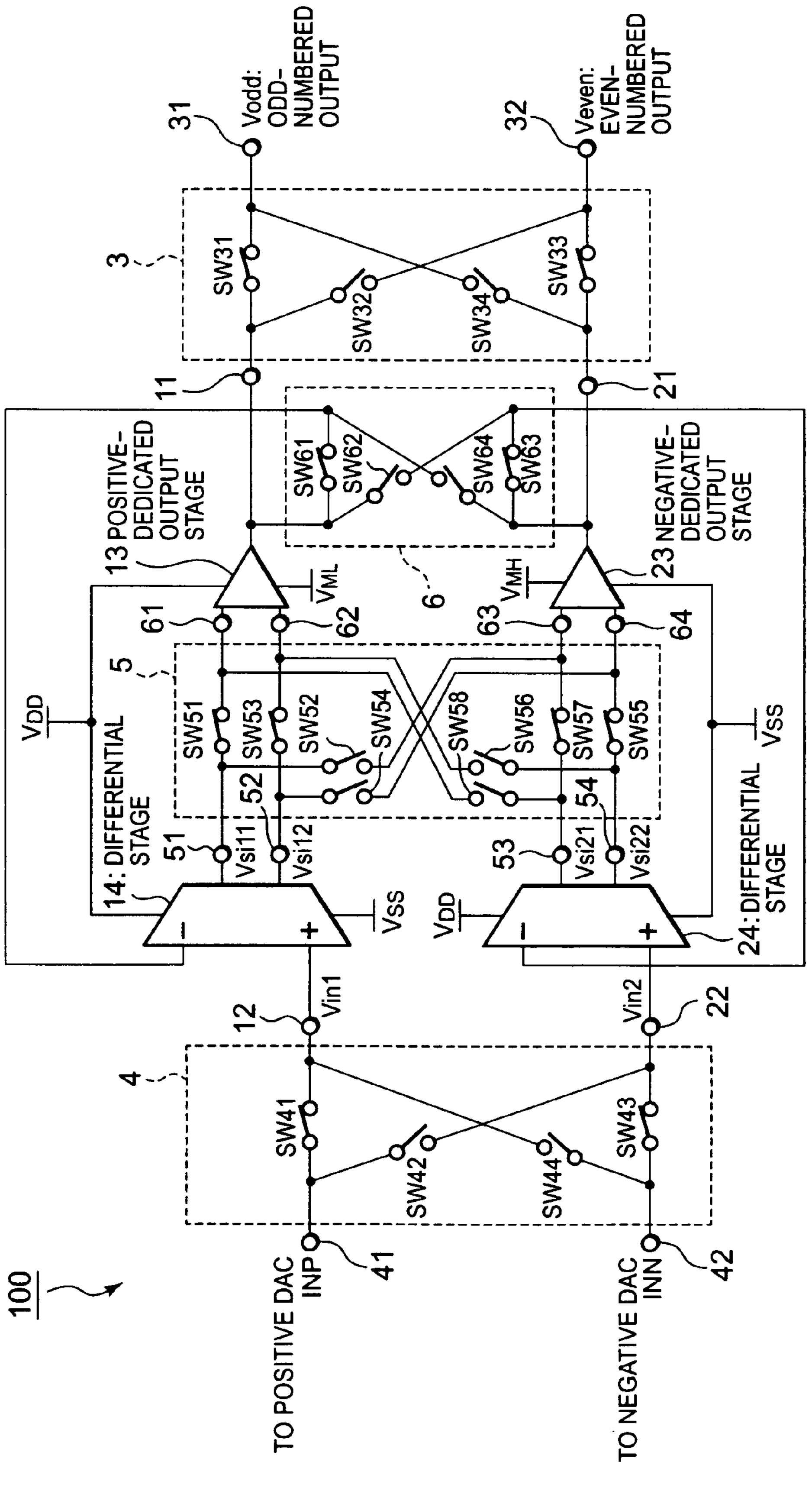
FIG. 5 is a circuit diagram showing the configuration of an operational amplifier circuit according to an embodiment of the present invention.

FIG. 5 is a circuit diagram showing the configuration of a power supply in an embodiment of an operational amplifier circuit 100 according to the present invention. As shown in FIG. 5, the operational amplifier circuit 100 according to the present invention is preferably utilized for an LCD driver that drives a capacitive load in an LCD panel by amplifying an input signal INP of a positive voltage outputted from a positive D/A (Digital Analog) converter (hereinafter referred to as a positive DAC) and an input signal INN of a negative voltage outputted from a negative D/A converter (hereinafter referred to as a negative DAC).

The operational amplifier circuit 100 according to the present invention includes input differential stage circuits 14, 24, output stage circuits 13, 23, and switch circuits 3 to 6. In the following description, the input differential stage circuits 14, 24 are referred to as differential stages 14, 24. In addition, the output stage circuits 13, 23 may be respectively referred to as a positive-dedicated output stage 13 and a negative-dedicated output stage 23.

The switch circuit 4 includes switches SW41 to SW44 and controls connections of terminals 41, 42 with input terminals 12, 22 in the input differential stage circuits 14, 24. Here, a positive voltage INP is inputted to the terminal 41 from the positive DAC and a negative voltage INN is inputted to the terminal 42 from the negative DAC.

The differential stage 14 outputs, to the switch circuit 5, two common-mode input stage output signals Vsi11, Vsi12 whose levels are shifted to sizes according to the input signal Vin1 (positive voltage INP or negative voltage INN) inputted via the switch circuit 4. Here, the differential stage 14 is connected to the switch circuit 5 via input stage output terminals 51, 52. The input stage output signal Vsi11 is outputted to the input stage output terminal 51 and the input stage output signal Vsi12 is outputted to the input stage output terminal 52. The differential stage 24 outputs, to the switch circuit 5, two common-mode input stage output signals Vsi21, Vsi22 whose levels are shifted to sizes according to the input signal Vin2 (positive voltage INP or negative voltage INN) inputted via the switch circuit 4. Here, the differential stage 24 is connected to the switch circuit 5 via input stage output terminals 53, 54. The input stage output signal Vsi11 is outputted to the input stage output terminal 53 and the input stage output signal Vsi12 is outputted to the input stage output terminal 54. The differential stages 14, 24 operate within a voltage range (first power supply voltage range) between the negative power supply voltage VSS (for example, GND potential) and the positive power supply voltage VDD.

The switch circuit 5 includes switches SW51 to SW58. The switches SW51, SW53 control connections of the input stage output terminals 51, 52 of the differential stage 14 with output stage input terminals 61, 62 of the positive-dedicated output stage 13. The switches SW52, SW54 control connections of the input stage output terminals 51, 52 of the differential stage 14 with output stage input terminals 63, 64 of the negative-dedicated output stage 23. The switches SW55, SW57 control connections of the input stage output terminals 53, 54 of the differential stage 24 with output stage input terminals 63, 64 of the negative-dedicated output stage 23. The switches SW56, SW58 control connections of the input stage output terminals 53, 54 of the differential stage 24 with the output stage input terminals 61, 62 of the positive-dedicated output stage 13.

The positive-dedicated output stage 13 is connected to the switch circuit 5 via the two output stage input terminals 61, 62. The positive-dedicated output stage 13 outputs, to the terminal 11, a single-ended signal in accordance with two input stage output signals which are inputted to the output stage input terminals 61, 62 from an input differential stage circuit connected to the positive-dedicated output stage 13 via the switch circuit 5. The negative-dedicated output stage 23 is connected to the switch circuit 5 via the two output stage input terminals 63, 64. The negative-dedicated output stage 23 outputs, to the terminal 21, a single-ended signal in accordance with two input stage output signals which are inputted to the output stage input terminals 63, 64 from an input differential stage circuit to the negative-dedicated output stage 23 connected via the switch circuit 5.

In addition, the positive-dedicated output stage 13 operates within a voltage range (second voltage range) between a power supply voltage VML and a positive power supply voltage VDD. The negative-dedicated output stage 23 operates within a voltage range (third voltage range) between a negative power supply voltage VSS and a power supply voltage VMH. The power supply voltage VML is a voltage higher than the negative power supply voltage VSS (GND). The power supply voltage VMH is a voltage lower than the positive power supply voltage VDD. Moreover, it is preferable that the power supply voltage VML be equal to or less than a half of an intermediate voltage (VDD−VSS) of the negative power supply voltage VSS and the positive power supply-voltage VDD. When the negative power supply voltage VSS is set as a ground potential GND, it is preferable that the power supply voltage VML be a voltage value equal to or less than a half of the positive power supply voltage VDD (VDD/

2). Also, it is preferable that the power supply voltage VHM be equal to or larger than a half of an intermediate voltage (VDD−VSS) of the negative power supply voltage VSS and the positive power supply voltage VDD. When the negative power supply voltage VSS is set as a ground potential GND, it is preferable that the power supply voltage VMH be a voltage value equal to or larger than a half of the positive power supply voltage VDD (VDD/2). Furthermore, it is preferable that the power supply voltage VML and the power supply voltage VMH be a voltage close to the mean potential (VDD/2).

The switch circuit 6 includes switches SW61 to SW64 and controls connections of input terminals of the input differential stage circuits 14, 24 with the output terminals 11, 21, the input terminals functioning as inverting input terminals when functioning as amplifier circuits.

The switch circuit 3 includes switches SW31 to SW34 and controls connections of the output terminals 11, 21 with an odd-numbered and even-numbered terminals 31, 32. Each of the odd-numbered terminal 31 and the even-numbered terminal 32 is connected to a drain line in the LCD panel. An unillustrated capacitive load (pixel capacity) connected to the odd-numbered terminal via the drain line is driven by an odd-numbered output Vodd to be outputted via the switch circuit 3. An unillustrated capacitive load (pixel capacity) connected to the even-numbered terminal 32 via the drain line is driven by an even-numbered output Veven to be outputted via the switch circuit 3. The switch circuit 3 switches polarities of the odd-numbered output Vodd and the even-numbered output Veven which are respectively outputted to the odd-numbered terminal 31 and the even-numbered terminal 32. Accordingly, the LCD panel is prevented from baking.

The differential stages 14, 24 and the output stages 13, 23 form an amplifier circuit with the switches 3 to 6. The operational amplifier circuit 100 according to the present invention changes the combination of connections in the switch circuits 3 to 6, so that the configuration of the amplifier circuit which drives the odd-numbered terminal 31 and the even-numbered terminal 32 can be changed. Specifically, patterns are switched from pattern 1 in which the switches SW31, SW33, SW41, SW43, SW51, SW53, SW57, SW55, SW61, SW63 are turned on and the switches SW32, SW34, SW42, SW44, SW52, SW54, SW56, SW58, SW62, SW64 are turned off to pattern 2 in which the odd-numbered switches are turned off and the even-numbered switches are turned on. It is preferable that patterns 1 and 2 be switched in synchronization with inversion of the polarity of an input voltage (output voltage) to the operational amplifier circuit 100.

In the case of pattern 1, the first positive-dedicated amplifier circuit in a voltage follower connection is configured of the differential stage 14 and the positive-dedicated output stage 13. The first negative-dedicated amplifier circuit in a voltage follower connection is configured of the differential stage 24 and the negative-dedicated output stage 23. At this time, the positive voltage INP from the positive DAC is inputted to a non-inverting input terminal (input terminal 12) of the first positive-dedicated amplifier circuit, and an output from the output terminal 11 is outputted to the odd-numbered terminal 31 as an odd-numbered output Vodd. In addition, the negative voltage INN from the negative DAC is inputted to a non-inverting input terminal (input terminal 22) of the first positive-dedicated amplifier circuit, and an output from the output terminal 21 is outputted to the even-numbered terminal 32 as an even-numbered output Veven.

On the other hand, in the case of pattern 2, a second positive-dedicated amplifier circuit in a voltage follower connection is configured of the differential stage 24 and the positive-dedicated output stage 13. A second negative-dedicated amplifier circuit in a voltage follower connection is configured of the differential stage 14 and the negative-dedicated output stage 23. At this time, the positive voltage INP from the positive DAC is inputted to a non-inverting input terminal (input terminal 22) of the second positive-dedicated amplifier circuit, and an output from the output terminal 11 is outputted to the even-numbered terminal 32 as an even-numbered output Veven. In addition, the negative voltage INN from the negative DAC is inputted to a non-inverting input terminal (input terminal 12) of the second negative-dedicated amplifier circuit and an output from the output terminal 21 is outputted to the odd-numbered terminal 31 as an odd-numbered output Vodd.

The positive-dedicated output stage 13 and the negative-dedicated output stage 23 according to the present invention respectively operates within the voltage ranges between the positive power supply voltages VDD to VDD/2 and VDD/2 to VSS. With this, power consumption consumed by the output stage can be reduced by half.

Moreover, in the present invention, the input differential stage circuit used for an amplifier uses the same input differential stage circuit even if the polarity of a voltage is changed. For example, the differential stage 14 is always used for the amplifier which outputs the odd-numbered output Vodd even when the polarity of a voltage is changed. At this time, the differential stage 24 is always used for the amplifier which outputs the even-numbered output Veven. The size of an offset voltage changes greatly depending on the input differential stage circuit. However, in the present invention, even when the polarity of a voltage is changed, the same input differential stage circuit is always used. Accordingly, the offset voltage shows a substantially same value even when the polarity thereof is changed. For this reason, the offset voltage of a signal outputted to the capacitive load by switching the polarity is apparently-cancelled without an offset cancel circuit. Thus, flicker in the display panel is decreased.

Furthermore, in the present invention, two input stage output signals, which are common mode signals, are outputted from the differential stage 14 to the output stages 13, 23. For this reason, as described later, the output characteristics from the differential stages 14, 24 hold symmetry. Accordingly, as shown in the conventional technique, it is possible to prevent the deterioration of the characteristics of the display panel, which might be otherwise caused due to a loss of the symmetry. Here, the input stage output signal having symmetrical output characteristic is a signal having a pulse rising time and a pulse fall time, which are substantially the same values.

Figure 6:
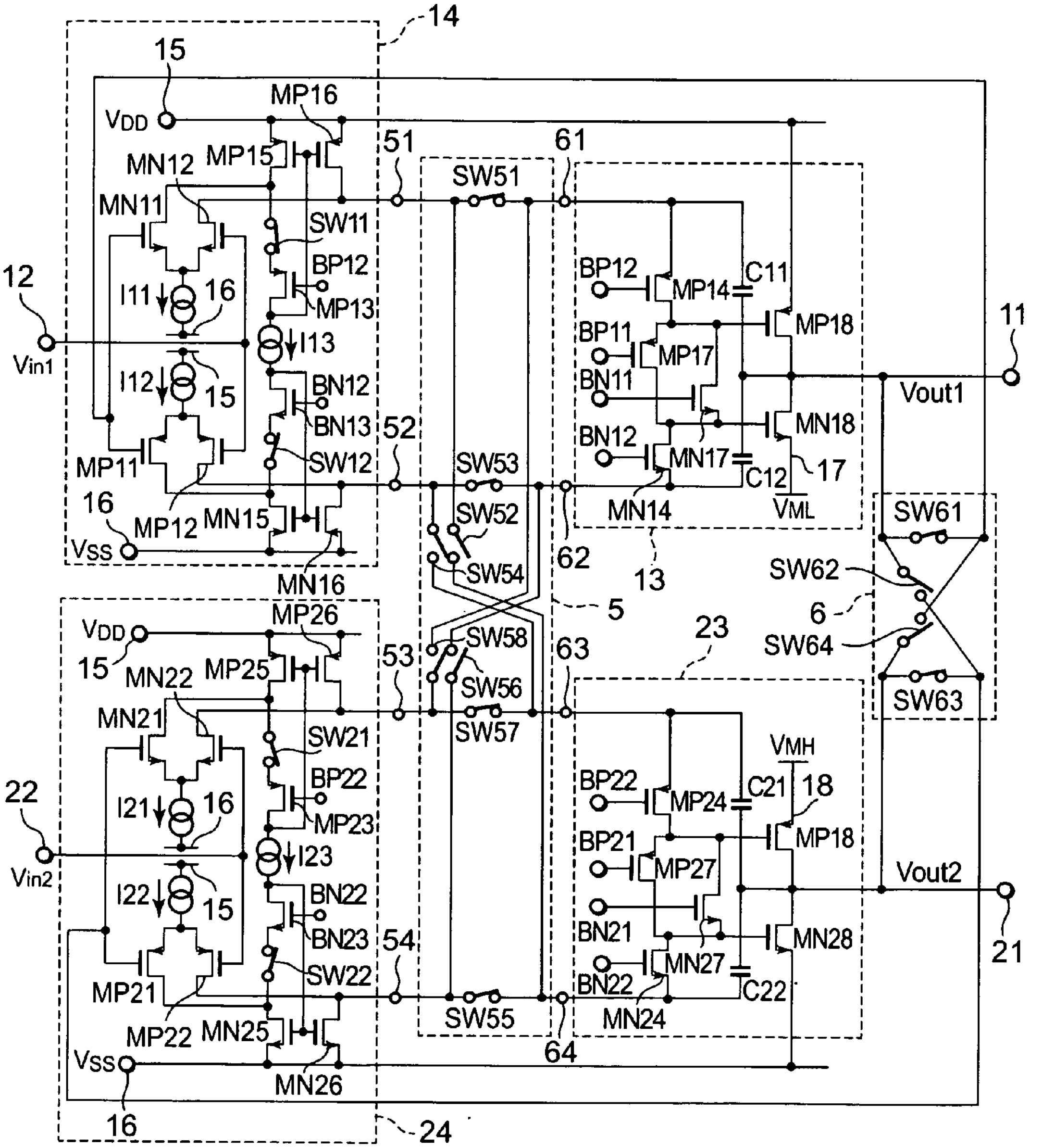
FIG. 6 is a circuit diagram showing the configuration of an input differential stage circuit, an output stage circuit, and a switch circuit according to the embodiment of the present invention.

FIG. 6 is a circuit diagram showing the detailed configuration of an inner equivalent circuit of the output stages 13, 23 and the differential stages 14, 24.

The differential stage 14 includes N-channel MOS transistors MN11, MN12, MN13, MN15, MN16, P-channel MOS transistors MP11, MP12, MP13, MP15, MP16, constant current sources I11, I12, a floating current source I13, and switches SW11, SW12.

Gates of the N-channel MOS transistors MN11, MN12 are respectively connected to the switch circuit 6 and the input terminal 12, so that an N-receiving differential pair is configured. The constant current source I11 is supplied with a negative power supply voltage VSS and supplies a bias current to N-receiving differential pair transistors (the N-channel MOS transistors MN11, MN12). Gates of the P-channel MOS transistors MP11, MP12 are respectively connected to the switch circuit 6 and the input terminal 12, so that a p-receiving differential pair is configured. The constant current source I12 is provided with a positive power supply voltage VDD and supplies a bias current to the P-receiving differential pair transistors (P-channel MOS transistors MP11, MP12). Gates of the N-channel MOS transistor MN11 and the PMOS transistor are connected to the output terminal 11 or 21 via the switch circuit 6.

Sources of the P-channel MOS transistors MP15, MP16 are commonly connected to the power supply terminal 15 (positive power supply voltage VDD) and drains thereof are respectively connected to the drains of the N-receiving differential pair transistors (N-channel MOS transistors MN11, MN12). A drain of the PMOS transistor MP15 is connected to the floating current source I13 via the switch SW11 and the PMOS transistor MP 13. Furthermore, gates of the P-channel MOS transistors MP15, MP16 are commonly connected to drains of the floating current source I13 and the PMOS transistor MP13. With this configuration, the P-channel MOS transistors MP15, MP16 function as active loads in a folded cascode connection. Note that a bias voltage BP2 is supplied to the gate of the PMOS transistor MP13.

The sources of the N-channel MOS transistors MN15, MN16 are commonly connected to the power supply terminal 16 (negative power supply voltage VSS) and the drains thereof are respectively connected to drains of the P-receiving differential pair transistors (P-channel MOS transistors MP11, MP12). The drain of the NMOS transistor MN15 is connected to the floating current supply I13 via the switch SW12 and the NMOS transistor MN13. Furthermore, the gates of the N-channel MOS transistors MN15, MN16 are commonly connected to the floating current supply I13 and the drain of the NMOS transistor MN13. With this configuration, the N-channel MOS transistors MN15, MN16 function as active loads in a folded cascode connection. Note that a bias voltage BN2 is supplied to the gate of the NMOS transistor MN13.

The switches SW11, SW12 are always turned on. The switches SW11, SW12 may be omitted. However, since a differential balance of the differential stage 14 can be kept by the switches SW11, SW12, it is preferable that the switches SW11, SW12 be inserted.

The drains of the NMOS transistor MN12 and the PMOS transistor MP16 are connected to the input stage output terminal 51, and, then, are connected to the output stage 13 (source of the PMOS transistor MP14) and the output stage 23 (source of the PMOS transistor MP24) via the switches SW51, SW52. The drains of the PMOS transistor MP12 and the NMOS transistor MP16 are connected to the input stage output terminal 52, and, then, are connected to the output stage 13 (source of the NMOS transistor MN14) and the output stage 23 (source of the NMOS transistor MN24) via the switches SW53, SW54. With the above-described configuration, the drains (input stage output terminal 51) of the NMOS transistor MN12 and the PMOS transistor PM16 and the drains (input stage output terminal 52) of the PMOS transistor MP12 and the NMOS transistor MN16 output two input stage output signals Vsi11, Vsi12 according to the input signal Vin1 inputted to the input terminal 12.

The differential stage 24 has a similar configuration. However, the N-channel MOS transistors MN11 to MN16, P-channel MOS transistors MP11 to MP16, constant current sources I11, I12, a floating current source I13, switches SW11, SW12, SW51 to SW54, bias voltages BP12, BN12, input stage output terminals 51, 52, input stage output signals Vsi11, Vsi12 are respectively read as N-channel MOS transistors MN21 to MN26, P-channel MOS transistors MP21 to MP26, constant current sources I21, I22, a floating current source I23, switches SW21, SW22 and SW55 to SW58, bias voltages BP22, BN22, input stage output terminals 53, 54 and input stage output signals Vsi21, Vsi22.

As described above, the differential stage 14 (24) according to the present invention has two differential pairs to which the input signal Vin1 (Vin2) is inputted and an active load which are in the folded cascode connection with each of the differential pairs. The two differential pairs are configured of transistors having a conductivity type different from that of the active load. Accordingly, the two input stage output signals Vi11, Vi12 (Vi21, Vi22) which are inputted to the output stage 13 or 23 from the differential stage 14 (24) become common-mode signals having different input levels.

In the differential stage 14 (24), when the voltage range of the input signal Vin1 (Vin2) is VSS to VDS(sat)+VGS, only the P-channel differential pair (PMOS transistors MP11, MP12 (MP21, MP22)) operates. In contrast, when the voltage range is VDS(sat)+VGS to VDD−(VDS(sat)+VGS), both of the P-channel differential pair (PMOS transistors MP11, MP12 (MP21, MP22)) and the N-channel differential pair (NMOS transistors MN11, MN12 (MN21, MN22)) operate. When the voltage range is VDD−(VDS (sat)+VGS) to VDD, only the N-channel differential pair (NMOS transistors MN11, MN12 (MN21, MN22)) operates. Here, VDS(sat) is a source-drain voltage in a switching boundary between a triode region and pentode region of the transistors included in the constant current sources I11, I12 (I21, I22), and VGS is a gate-source voltage of the transistors forming the differential pair (NMOS transistors MN11, MN12 (MN21, MN22) and the PMOS transistors MP11, MP12 (MP21, MP22)). Consequently, the differential stages 14, 24 perform a Rail-to-Rail operation in the voltage range of all the input voltages VSS to VDD.

The positive-dedicated output stage 13 includes N-channel MOS transistors MN14, MN17, MN18, P-channel MOS transistors MP14, MP17, MP18, and phase compensation capacities C1, C2.

Drains and sources of the P-channel MOS transistor MP17 and the N-channel MOS transistor MN17 are connected with respect to each other. The P-channel MOS transistor MP17 and the N-channel MOS transistor MN17 function as floating current sources with gates thereof being respectively supplied with the bias voltages BP11, BP12. The gate of the P-channel MOS transistor MP14 is connected to the bias constant voltage source (bias voltage BP2) and the drain thereof is connected to one end of the floating current source (P-channel MOS transistor MP7 and the N-channel MOS transistor MN7). The gate of the N-channel MOS transistor MN14 is connected to the bias constant voltage source (bias voltage BN12) and the drain thereof is connected to the other end of the floating current source (P-channel MOS transistor MP7 and N-channel MOS transistor MN7). In addition, the source of the P-channel MOS transistor MP14 is connected to the output terminal 11 via the phase compensation capacity C11 and the source of the N-channel MOS transistor MN14 is connected to the output terminal 11 via the phase compensation capacity C12.

The drain of the PMOS transistor MP18 and the drain of the NMOS transistor MN18 are connected via the output terminal 11. The gate of the PMOS transistor MP18 is connected to one end of the floating current source (and the drain of the P-channel MOS transistor MP14) and the source thereof is connected to the power supply terminal 15 (positive power supply voltage VDD). The gate of the NMOS transistor MN18 is connected to the other end of the floating current source (and the drain of the N-channel MOS transistor MN14), and the source thereof is connected to the power supply terminal 17 to which the power supply voltage VML is supplied.

The negative-dedicated output stage 23 has a similar configuration. However, the N-channel MOS transistors MN14, MN17, MN18, P-channel MOS transistors MP14, MP17, MP18, phase compensation capacities C11, C12, power supply terminal 15 (positive power supply voltage VDD), power supply terminal 17 (power supply voltage VML), and bias voltages BP11, BP12, BN11, BN12 are respectively read as N-channel MOS transistors MN24, MN27, MN28, P-channel MOS transistors MP24, MP27, MP28, phase compensation capacities C21, C22, a power supply terminal 16 (negative power supply voltage VSS), a power supply terminal 18 (power supply voltage VMH), and bias voltages BP21, BP22, BN21, BN22.

The switch SW61 controls a connection of the output terminal 11 with the differential stage 14 (NMOS transistor MN11 and PMOS transistor MP11). The switch SW62 controls a connection of the output terminal 11 with the differential stage 24 (NMOS transistor MN21 and PMOS transistor MP21). The switch SW63 controls a connection of the output terminal 21 with the differential stage 24 (NMOS transistor MN21 and PMOS transistor MP21). The switch SW64 controls a connection of the output terminal 21 with the differential stage 14 (NMOS transistor MN11 and PMOS transistor MP11).

As described above, the input transistors of the output stage 13 (23) (PMOS transistor MP14 (MP24) and NMOS transistor MN14 (MN24)) and the output transistors thereof (PMOS transistor MP18 (MP28) and NMOS transistor NM18 (MN28)) are respectively symmetrically formed with respect to the output terminal 11. The output terminal 13 (23) outputs a single-ended signal based on the two common-mode input stage output signals Vsi11, Vsi12 (Vsi21, Vsi22) having the different input levels to the output terminal 11 (21) as an output signal Vout1 (Vout2). At this time, an idling current of the output transistors (PMOS transistor MP18 and NMOS transistor MN18) is determined by the bias voltages BP11, BN11.

In general, the voltage-range of the input signal INP inputted from the positive DAC is VDD/2 to VDD and the voltage range of the input signal INN inputted from the negative DAC is VSS to VDD/2. On the other hand, the differential stages 14, 24 perform the Rail-to-Rail operation between the negative power supply voltage VSS(GND) and the positive power supply voltage VDD. Accordingly, the range of voltage which can be inputted to the amplifiers having the individual differential stages 14, 24 as input stages is to be VSS to VDD. Thus, the range of voltage which can be inputted from the positive DAC to the operational amplifier circuit 100 satisfies the input characteristic to be required for an LCD panel.

On the other hand, the output stages 13, 23 are supplied with power supply voltages VML, VMH which are set in a vicinity of an intermediate voltage (VDD/2) of the positive power supply voltage VDD and the negative power supply voltage VSS. Accordingly, the range of power supply voltage to be supplied to the output stages 13, 23 is limited as compared with the case of the differential stages 14, 24 and the range of voltage which can be outputted is also limited. The ranges of voltages which can be outputted from the output stages 13, 23 are described in detail below.

The switch circuits 5, 6 form the positive-dedicated amplifier in which the positive-dedicated output stage 13 and the differential stage 14 (24) are in the voltage follower connection. Accordingly, voltages of the output signal (Vout1) and the input signal (Vin1 or Vin2: input signal INP) are equalized, that is, Vout1=Vin1 (Vin2). However, this equation is true when the range of voltage which can be inputted to the differential stage 14 (24) and the range of voltage which can be outputted from the positive-dedicated output stage 13 satisfy the input output characteristics which are required for an LCD driver.

For example, the range of voltage which can be outputted from the positive-dedicated output stage 13 constituting the positive-dedicated amplifier circuit is to be VML+0.2V to VDD−0.2V. In general, the output characteristic that is required for a positive-dedicated amplifier to be utilized for an LCD driver is VDD/2+0.2V to VDD−0.2V. Accordingly, to satisfy the output characteristic required for an LCD driver, it is preferable that the power supply voltage VML be larger than the negative power supply voltage VSS and equal to or less than a half of the positive power supply voltage VDD (VSS<VML≦VDD/2). In this case, the range of an operational voltage of the positive-dedicated amplifier circuit is made sufficient as an amplifier to input and output a positive polarity, so that the required characteristic for the LCD driver is satisfied.

Similarly, the switch circuits 5, 6 form a negative-dedicated amplifier circuit in which the negative-dedicated output stage 23 and the differential stage 14 (24) are in the voltage follower connection. Accordingly, voltages of the output signal (Vout2) and the input signal (Vin1 or Vin2: input signal INN) are equalized, that is, Vout2=Vin1 (Vin2). However, this equation is true when the range of voltage which can be inputted to the differential stage 14 (24) and the range of voltage which can be outputted from the positive-dedicated output stage 13 satisfy the input and output characteristics which are required for an LCD driver.

For example, the range of voltage which can be outputted from the negative-dedicated output stage 23 constituting the negative-dedicated amplifier circuit is to be VSS+0.2V to VMH−0.2V. In general, the output characteristic that is required for a negative-dedicated amplifier to be utilized for an LCD driver is VSS+0.2V to VDD/2−0.2V. Accordingly, to satisfy the output characteristic required for an LCD driver, it is preferable that the power supply voltage VMH be equal to or larger than a half of the positive power supply voltage VDD and less than the positive power supply voltage VDD (VDD/2≦VML<VDD). In this case, the range of an operational voltage of the negative-dedicated amplifier circuit is made sufficient as an amplifier to input and output a negative polarity so that the required characteristic for the LCD driver is satisfied.

Even when the rage of power supply voltage to be supplied to the differential stages 14, 24 is large, a value of current flowing through the differential stages 14, 24 is generally small. In the present invention, a power supply voltage (VSS to VDD) in a large voltage range is supplied to the differential stages 14, 24 in order to maintain the input characteristic of the amplifier. However, since the current flowing through the differential stages 14, 24 is small, the power consumption of the differential stages 14, 24 is extremely small as compared with the power consumption of the output stages 13, 23. That is, the power consumption at the differential stages 14, 24 has an amount which has almost no effect on the entire power consumption of the operational amplifier circuit 100.

On the other hand, the current flowing through the output stages 13, 23 is the sum of an idling current which is a several times larger current than the current flowing through the differential stages 14, 24 and the current flowing through the output load. Accordingly, the current flowing through the output stages 13, 23 generally constitutes approximately 80% of the entire power consumption of the amplifier circuit.

Thus, the decrease of the power consumption by lowering the power supply voltage of only the output stages 13, 23 (decreasing the power supply voltage range) has a large effect on the decrease of the entire power consumption of the amplifier circuit. The range of the power supply voltage of the output stages 13, 23 according to the present invention is smaller than that of a conventional one. Thus, the power consumption of the operational amplifier circuit 100 can be decreased.

The switch circuit 5 according to the present invention is connected between the input stage output terminals 51 to 54 of the differential stages 14, 24 and the output stage input terminals 61 to 64 of the output stages 13, 23. It is preferable that the switch circuit 5 be inserted in a position where impedance is relatively low in the amplifier circuit configured of the differential stages 14, 24 and the output stage 13 (23). In this embodiment, the switch circuit 5 is inserted between the drain of the PMOS transistor MP16 and the sources of the PMOS transistors MP14, MP24 and between the drain of the NMOS transistor NM16 and the sources of the NMOS transistors MN14, MN24. Both of the source of the P-channel MOS transistor MP14 (MP24) and the source of the N-channel MOS transistor MN14 (MN24) have relatively low impedance, both sources being switched by the switch circuit 5. The reason is that these transistors are in the folded cascode connection and operate with a grounded gate. For this reason, even when the connection is switched by the switch circuit 5, a voltage inputted to the output stage input terminals 61, 62 (63, 64) hardly changes. This includes an effect to prevent a side effect that an abnormal current flows through a circuit at that moment when the switch circuit 5 is switched. However, the inserting position of the switch circuit 5 is not limited to that in this embodiment.

As a switch in this embodiment, an NMOS transistor or a PMOS transistor in which on and off are controlled by a gate voltage or a transfer gate utilizing the both transistors are preferably utilized. However, it is preferable that which type of switch is utilized is determined according to a potential of the switch. For example, when a voltage applied to the switch is higher than almost VDD/2, a P-channel MOS transistor is used as a switch. In contrast, when a voltage to be applied to the switch is lower than almost VDD/2, it is preferable that an N-channel MOS transistor be used as a switch. Furthermore, in a case where the switch has to be operated in the all ranges of the input voltages from the negative power supply voltage VSS (GND) to the positive power supply voltage VDD, it is preferable that a transfer gate is used as a switch.

Since the ranges of operations of the switches SW51 to SW58 which are utilized for the switch 5 are limited, the N-channel MOS transistor or the P-channel MOS transistor is preferably utilized according to the individual potential. However, each of switches other than the switches SW51 to SW58, such as switches SW31 to SW34, SW41 to SW44, and SW61 to SW64, has to be operated in all regions from the negative power supply voltage VSS (GND) to the positive power supply voltage VDD. Accordingly, a transfer gate using the N-channel MOS transistor and the P-channel MOS transistor is preferably utilized for the individual switch.

Figure 7A:
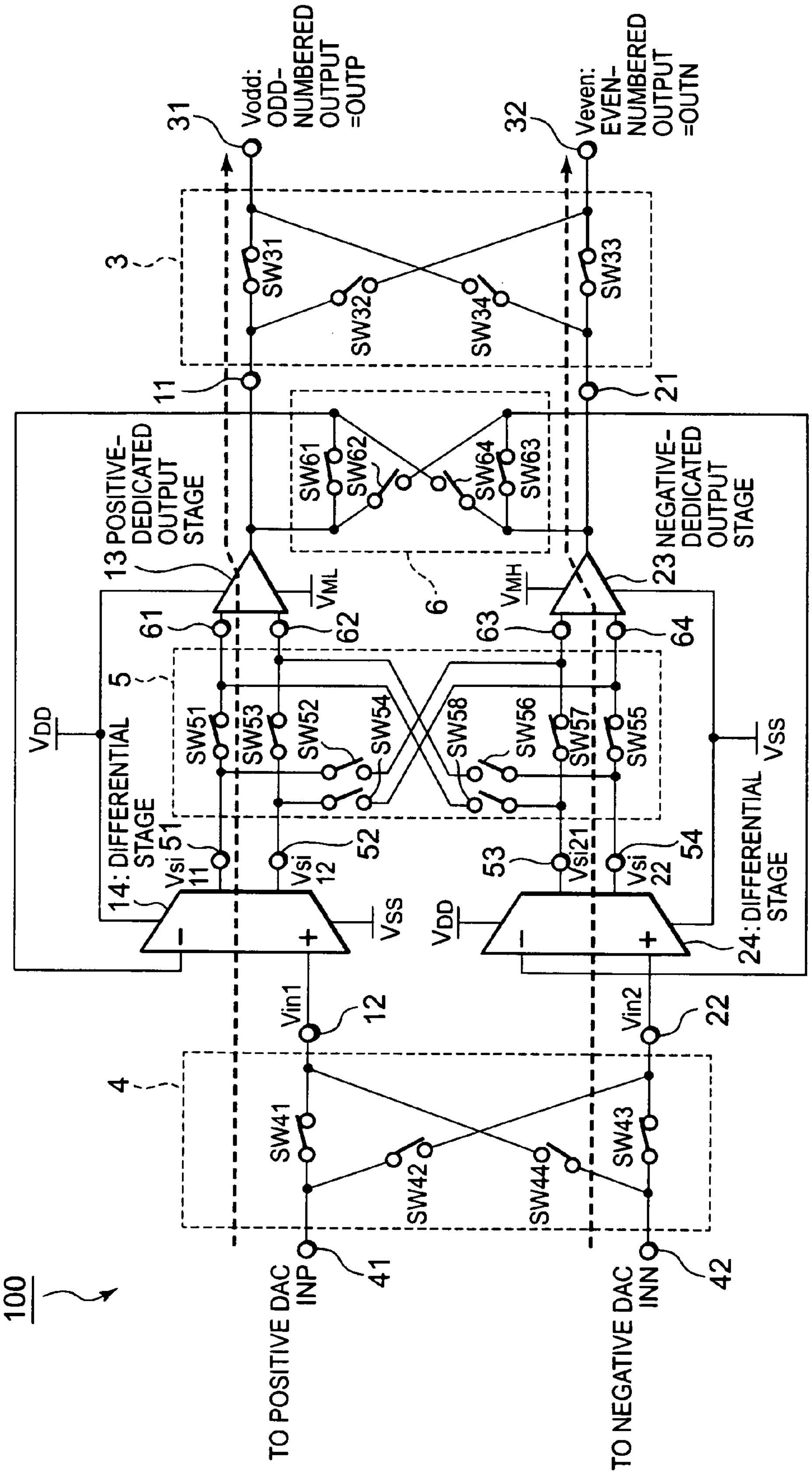
FIGS. 7A and 7B are views which respectively show signal paths (patterns 1 and 2) in the operational amplifier circuit according to the present invention.
Figure 7B:
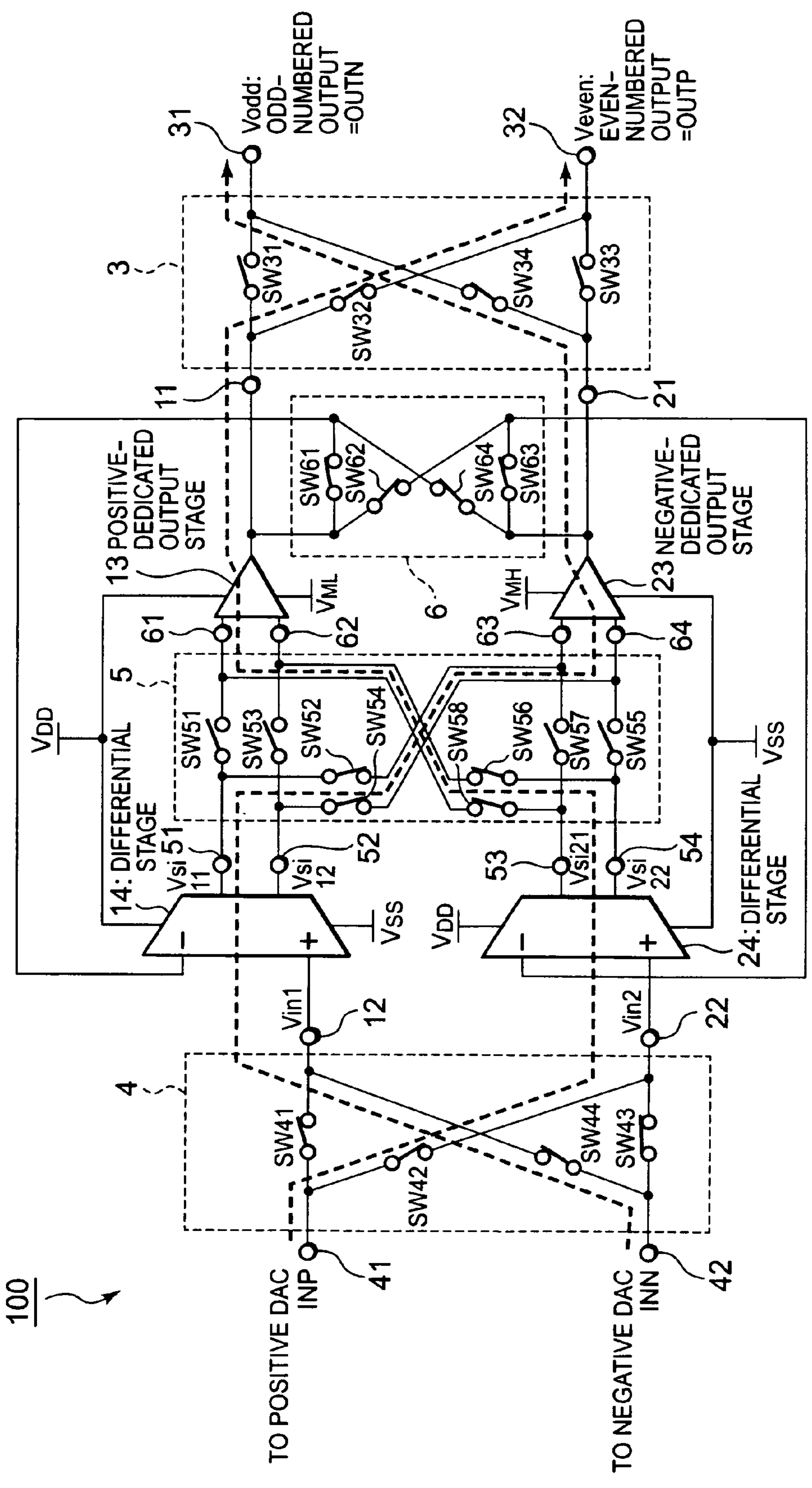
Figure 8:
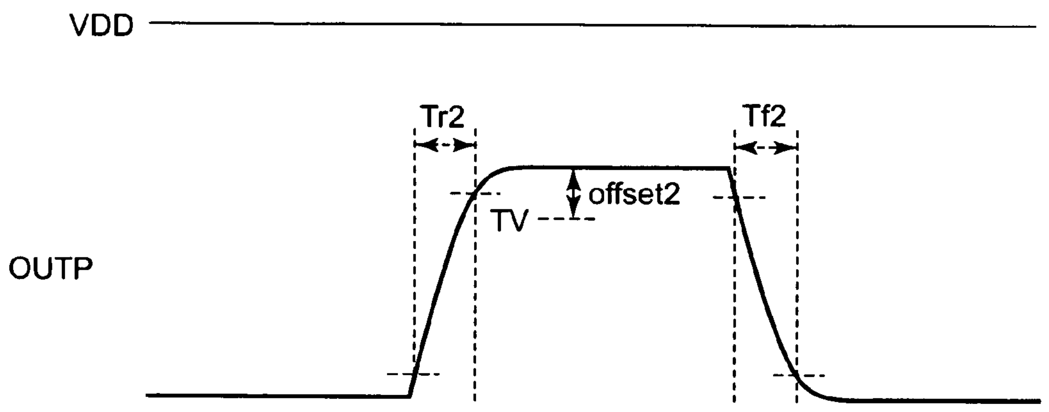
FIG. 8 is a view showing one example of an output characteristic of the operational amplifier circuit according to the present invention.

Referring now to FIG. 7A to FIG. 8, a flicker suppression effect according to the present invention is described. FIGS. 7A and 7B are schematic views, each showing a signal path in the operational amplifier circuit 100 according to the present invention. In the operational amplifier circuit 100, the switch circuits 3 to 6 are controlled to switch the two signal paths from pattern 1 shown in FIG. 7A to pattern 2 shown in FIG. 7B.

As shown in FIG. 7A, the signal path of pattern 1 is described. The positive voltage (input signal INP) from the positive DAC is amplified by the amplifier circuit configured of the differential stage 14 and the positive-dedicated output stage 13, and is outputted from the odd-numbered terminal 31 as an odd-numbered output Vodd. At this time, the odd-numbered output Vodd becomes a positive output signal OUTP. In contrast, the negative voltage (input signal INN) from the negative DAC is amplified by the amplifier circuit configured of the differential stage 24 and the negative-dedicated output stage 23, and is outputted from the even-numbered terminal 32 as an even-numbered output Veven. At this time, the even-numbered output Veven becomes a negative output signal OUTN.

As shown in FIG. 7B, the signal path of pattern 2 is described. The positive voltage (input signal INP) from the positive DAC is amplified by the amplifier circuit configured of the differential stage 24 and the positive-dedicated output stage 13, and is outputted from the even-numbered terminal 32 as an even-numbered output Veven. At this time, the even-numbered output Veven becomes a positive output signal OUTP. In contrast, the negative voltage (input signal INN) from the negative DAC is amplified by the amplifier circuit configured of the differential stage 14 and the negative-dedicated output stage 23, and is outputted from the odd-numbered terminal 31 as an odd-numbered output Vodd. At this time, the odd-numbered output Vodd becomes a negative output signal OUTN.

As described above, even when the polarity of the output signal with respect to the same terminal is switched, the same input differential stage of the amplifier circuit is used as a differential stage for driving the terminal. For example, focusing on the odd-numbered terminal 31, it can be seen that at the time of outputting a positive polarity and a negative polarity, the same differential stage 14 is used as the signal path. Similarly, focusing on the even-numbered terminal 32, it can be seen that at the time of outputting a positive polarity and a negative polarity, the same differential stage 24 is used as a signal path.

FIG. 8 is a view showing one example of the output characteristic of the operational amplifier circuit 100 according to the present invention. Here, an offset voltage is defined as a difference between a target voltage and the maximum value of the positive output OUTP or the minimum value of the negative voltage OUTN. In addition, the sum of absolute values of differences between a reference voltage VCOM and each of the positive voltage OUTP and the negative voltage OUTN is defined as Swinging Voltage. Here, the maximum value of the difference between the positive voltage OUTP and the negative voltage OUTN is defined as Swinging Voltage.

Figure 2:
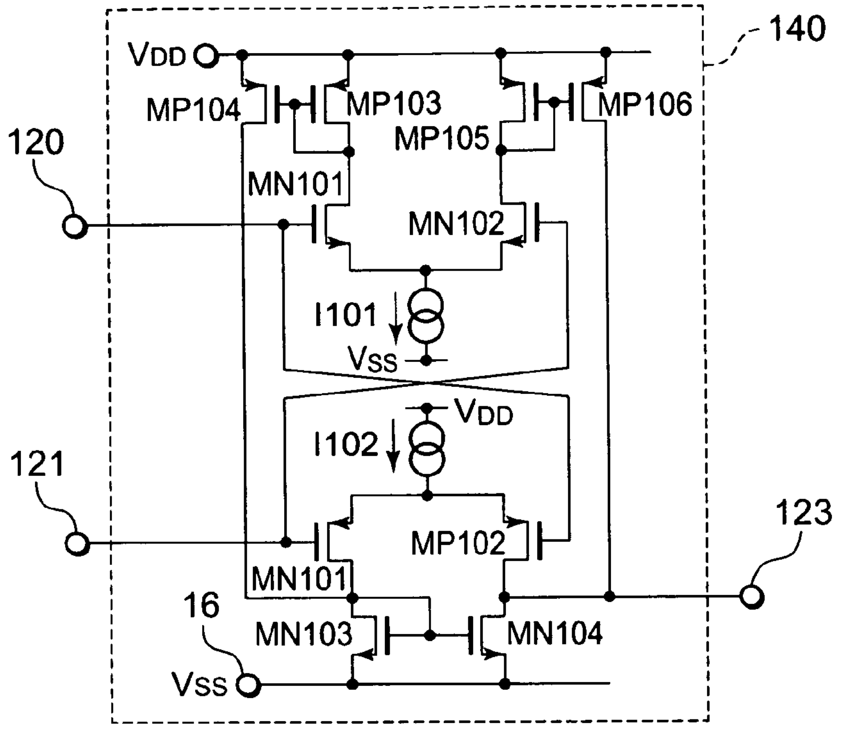
FIG. 2 is a circuit diagram showing the configuration of a differential input stage circuit according to the conventional technique.
Figure 3:
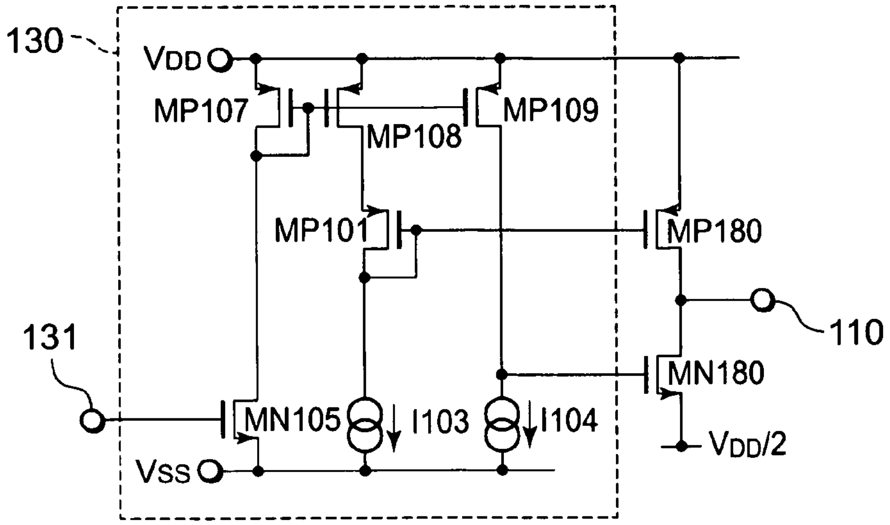
FIG. 3 is a circuit diagram showing the configuration of a driving stage circuit according to the conventional technique.
Figure 4:
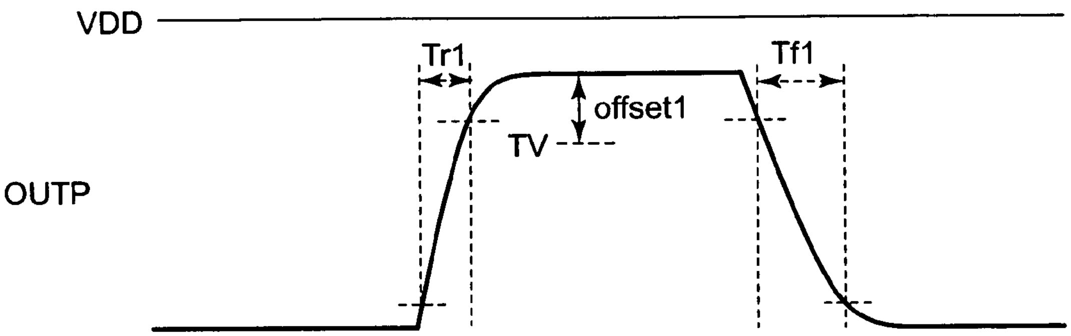
FIG. 4 is a view showing one example of an output characteristic of the operational amplifier circuit according to the conventional technique.

The input differential stage determines an offset voltage of the amplifier. Accordingly, in a conventional amplifier circuit in which different input differential stages are used according to the switching of the positive output and the negative output, a different offset voltage is generated for each polarity. In such an amplifier, a difference of Swinging Voltage between the output terminals (for example, between the odd-numbered terminal and the even-numbered terminal) becomes large, which does not satisfy the specification of an LCD driver. On the other hand, in the related art shown in FIGS. 1 to 3, the same differential stage is utilized for each output terminal. Accordingly, an offset voltage shows the same value even when the polarity is switched. Thus, there is no difference between Swinging Voltage in the odd-numbered output Vodd and Swinging Voltage in the even-numbered output Veven. However, output characteristics of differential input stage circuits 140, 240 lose symmetry. That is, as shown in FIG. 4, the pulse of the output signal which drives the capacity load is asymmetric. Accordingly, there is a case where the operational amplifier circuit shown in FIG. 1 does not satisfy the specification (charge and discharge characteristics) of an LCD driver.

On the other hand, as described above, even when the polarity of the output signal to the same terminal is switched, the operational amplifier circuit 100 according to the present invention uses the same input differential stage as a differential stage of an amplifier circuit for driving the terminal. In addition, the differential stage 14 according to the present invention has an N-channel type differential pair and a P-channel type differential pair, and common-mode input stage output signals Vsi11, Vsi12 which have different input levels are inputted to the output stages 13, 23. Similarly, the differential stage 24 according to the present invention has an N-channel type differential pair and a P-channel type differential pair, and common-mode input stage output signals Vsi21, Vsi22 which have different input levels are inputted to the output stages 13, 23. Furthermore, the switch circuit 5 switches connections of the differential stages 14, 24 with the output stages 13, 23 by using the input terminals of the input stage output signals Vsi11, Vsi12, Vsi21, Vsi22 as boundaries. For this reason, as the positive output OUTP as shown in FIG. 8, a rise time Tr2 and a fall time Tf2 of the pulse are substantially equalized. However, the rise time Tr2 is time for a rise of the maximum value of the pulse from 10% to 90%, and the fall time Tf2 is time for a fall of the maximum value of the pulse from 90% to 10%. In addition, the offset voltage offset2 which is the difference between the target voltage TV and the maximum value of the pulse shows a smaller value than the conventional one. Similarly, the rise time and fall time of the pulse on the negative output OUTN show substantially the same value. Moreover, the offset voltage which is the difference between the target voltage TV and the maximum value of the pulse also becomes smaller than the conventional one.

As described above, the rise time and fall time of each of the positive output OUTP and the negative output OUTN are equalized. Accordingly, the operational amplifier circuit 100 according to the present invention satisfies the specification (charge and discharge characteristics) of an LCD driver for driving an LCD panel. In addition, the value of the offset voltage becomes smaller than a conventional one due to the configuration of the circuit. Accordingly, when the operational amplifier circuit 100 according to the present invention is applied to the LCD driver, an amplitude difference deviation characteristic thereof becomes preferable, so that an excellent image quality can be obtained. Furthermore, the current paths in the differential stages 14, 24 constituting the amplifier circuit are less than those of the differential input stage circuits 140, 240 according to the conventional technique. Thus, the power consumption of the operational amplifier circuit 100 is further reduced.

Figure 9:
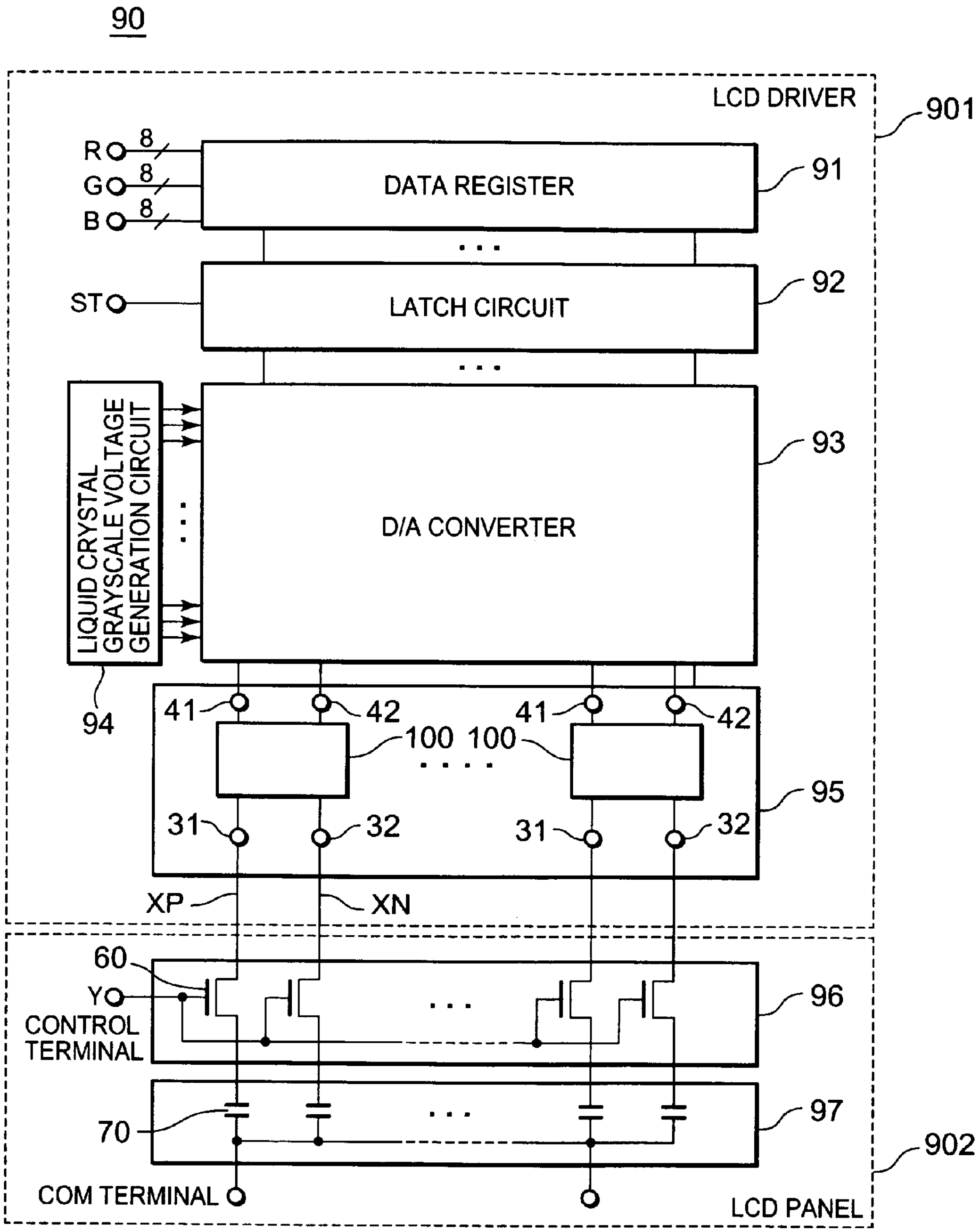
FIG. 9 is a view showing the configuration of a display device according to the present invention.

The operational amplifier circuit 100 according to the present invention is suitably used for, for example, a data line driving circuit section 95 of the LCD driver 901 provided in the display device 90 shown in FIG. 9. As shown in FIG. 9, the display device 90 includes a driver (LCD driver 901) and a display panel (LCD panel 902) driven by the LCD driver 901.

The LCD driver 901 includes a data register 91 for taking 8-bit digital display signals R, G, and B, a data latch circuit 92 for latching the digital signals R, G, and B in synchronization with a strobe signal ST, a D/A converter 93 including a parallel N-stage digital-analog converter (positive DAC and negative DAC), a liquid crystal grayscale voltage generation circuit 94 which outputs a generation voltage having a gamma transformation characteristic according to the characteristic of the liquid crystal, and a data line driving circuit section 95 having multiple operational amplifier circuits 100 which buffers a voltage from the D/A converter 93.

The LCD panel 902 includes TFTs (Thin Film Transistor) 60 (TFT group 96) and multiple pixel capacities 70 (pixel capacity group 97), the TFTs being provided in intersection regions of multiple positive-side and negative-side data lines XP and XN and multiple scanning lines Y. A gate of each of the TFTs 60 is connected to an unillustrated gate driver via the scanning line Y. In addition, a source of the TFT 60 is connected to the operational amplifier circuit 100 via the positive data line XP or the negative data line XN, and a drain thereof is connected to a COM terminal via the pixel capacity 70.

In FIG. 9, the LCD panel 902 only has the TFT group 96 and the pixel capacity group 97 for one row corresponding to one scanning line Y. However, the LCD panel 902 generally has the TFT group 96 and the pixel capacity group 97 for multiple rows corresponding to multiple scanning lines.

The liquid crystal grayscale voltage generation circuit 94 generates a reference voltage and is selected by a decoder (unillustrated) constituted of a ROM switch in the D/A converter 93 and the like. The D/A converter 93 selects a reference voltage according to the 8-bit digital display signal from the latch circuit 92. After the D/A conversion, the D/A converter 93 supplies the multiple operation amplifier circuits 100 with the converted signals via the input terminals 41, 42 as the input signals INP, INN. The operational amplifier circuit 100 outputs the output signals OUTP, OUTN to the liquid crystal element serving as the pixel capacity 70 via the output terminals 31, 32 and the TFT 60. At this time, a gate of the TFT group 70 is driven by an unillustrated gate driver.

Recently, the number of outputs of an LDC driver exceeds 1000 channels. Accordingly, operational amplifiers in the voltage follower connection, the number of which is the same as that of channels, are required. Thus, the power consumption as one chip becomes 1000 times larger than the power consumption of 1 operational amplifier. For this reason, as described above, the operational amplifier circuit 100 according to the present invention is used for the LCD driver 901, so that the total power consumption of the chip can be dramatically reduced. In addition, with the increase in the power consumption, a temperature of the chip may reach nearly 150° C. which is the limitation for silicon. However, since the current consumption of the chip on which the operational amplifier circuit 100 according to the present invention is mounted is reduced, the increase in the chip temperature can be suppressed.

In addition, when the operational amplifier circuit 100 is mounted on the LCD driver 95, it is needed that the above-described two power supply voltages VML, VNH are properly set. It is suitable that the power supply voltages VML, VMH are set in consideration of the γ-curve which is set with respect to the display device 90. That is, necessary input and output voltages are determined by a γ voltage and, then, the optimum voltages of the power supply voltages VML, VMH are determined based on the input and out voltages. As a result, a power supply can be set without any loss.

Furthermore, in a case where bi-polar type (capable of discharge and suction of current) power supply can be provided to the display device 90, the power supply voltages VML, VMH are commonly connected to supply power as one power supply. In this method, the current consumed in the positive-dedicated output stage 13 can be reused in the negative-dedicated output stage 23. Thus, the power consumption of the system can be further reduced.

Furthermore, in the item of amplitude difference deviation of the specification for the LCD driver, an almost ideal characteristic can be shown. Thus, an offset cancel circuit which is conventionally needed is unnecessary. As a result, the liquid crystal display device 90 can prevent flicker in the display panel 902 from occurring without mounting the offset cancel circuit.

As described above, the embodiment of the present invention is described in detail. However, the specific configuration of the present invention is not limited to the embodiment described above. The present invention includes an embodiment modified without departing from the scope of the invention.

What is claimed is:

1. A driver for a liquid crystal display panel, said driver, comprising:

a first input differential stage circuit which comprises:

a first active load comprising a plurality of first conductive-type transistors in a folded cascade connection; and a second active load comprising a plurality of second conductive-type transistors in the folded cascade connection;

a first output stage circuit;

a second output stage circuit; and a first switch circuit configured to select one of said first and second output stage circuits and to connect an input pair of the selected output stage circuit with an output pair of said first input differential stage circuit, wherein one of a positive polarity voltage and a negative polarity voltage, and a first single end signal, which is outputted from the selected output stage circuit, are inputted to said first input differential stage circuit, wherein said first input differential stage circuit outputs from the output pair thereof two first input stage output signals having signal levels different from each other based on one of said positive polarity voltage and said negative polarity voltage, wherein each input pair of said first output stage circuit and said second output stage circuit is connected with the outer pair of said first active load and said second active load in said first input differential stage circuit through said first switch circuit, and said two first input stage output signals from said first active load and said second active load are inputted to said input pair of the selected output stage circuit, and wherein the selected output stage circuit outputs said first single end signal based on said two first input stage output signals to a capacitive load of said liquid crystal display panel.

2. The driver for a liquid crystal display panel according to claim 1, wherein said first switch circuit switches the output stage circuit connected with said first input differential stage circuit to an other of said first and second output stage circuits in synchronization with an inversion of a polarity of a voltage inputted to said first input differential stage circuit.

3. The driver for a liquid crystal display panel according to claim 1, further comprising:

a second input differential stage circuit comprising an active load of a plurality of transistors in the folded cascade connection, wherein said first switch circuit connects one of respective output pairs of said first input differential stage circuit and said second input differential stage circuit with an input pair of said first output stage circuit and connects an other one of respective output pairs of said first input differential stage circuit and second input differential stage circuit with an input pair of said second output stage circuit, wherein an other of said positive polarity voltage and said negative polarity voltage, and a second single end signal, which is outputted from the output stage circuit connected with, said second input differential stage circuit, are inputted to said second input differential stage circuit, wherein said second input differential stage circuit outputs from the output pair thereof two second input stage output signals having signal levels different from each other based on the other of said positive polarity voltage and said negative polarity voltage, and wherein the output stage circuit connected with said second input differential stage circuit outputs said second single-ended signal based on said two second input stage output signals to another capacity load, which is different from said capacity load, in said liquid crystal display panel.

4. The driver for a liquid crystal display panel according to claim 3, further comprising:

a second switch circuit configured to connect one of respective inputs of said first input differential stage circuit and said second input differential stage circuit and an output terminal of the first output stage circuit and connect the other with an output terminal of said second output stage circuit, wherein an amplifier circuit of a voltage follower connection is formed from said output stage circuit connected with said first input differential stage circuit through said first switch circuit and said first input differential stage circuit, and wherein an amplifier circuit of a voltage follower connection is formed from said output stage circuit connected with said second input differential stage circuit through said first switch circuit and said second input differential stage circuit.

5. The driver for a liquid crystal display panel according to claim 3, wherein a power supply voltage in a first voltage range is supplied to said first input differential stage circuit and said second input differential stage circuit, wherein a power supply voltage in a second voltage range which is lower than said first voltage range is supplied to said first output stage circuit, and wherein a power supply voltage in a third voltage range which is lower than said first voltage range is supplied to said second output stage circuit.

6. The driver for a liquid crystal display panel according to claim 5, wherein a first voltage and a second voltage are supplied to said first input differential stage circuit and said second input differential stage circuit as the power supply voltages, wherein said first voltage and a third voltage which is higher than said second voltage are supplied to said first output stage circuit as the power supply voltage, and wherein a fourth voltage which is lower than said first voltage and said second voltage are supplied to said second output stage circuit as the power supply voltage.

7. The driver for a liquid crystal display panel according to claim 6, wherein said third voltage and said fourth voltage are equal to each other.

8. The driver for a liquid crystal display panel according to claim 7, wherein said third voltage and said fourth voltage are intermediate voltages between said first voltage and said second voltage.

9. The driver for a liquid crystal display panel according to claim 3, wherein said first input differential stage circuit and said second input differential stage circuit are subjected to a rail-to-rail operation.

10. The driver for a liquid crystal display panel according to claim 1, wherein each of said first output stage circuit and said second output stage circuit comprises a first conductive-type gate-grounded transistor of folded cascade connection and a second conductive-type gate-grounded transistor, and wherein a source of said first conductive-type gate-grounded transistor is connected with a drain of a first conductive-type transistor of said first active load through said first switch circuit, and a source of said second conductive-type gate-grounded transistor is connected with a drain of said second conductive-type transistor of said second active load through said first switch circuit.

11. The driver for a liquid crystal display panel according to claim 10, wherein said first input differential stage circuit further comprises:

a second conductive-type differential pair transistors connected with said first active load; and a first conductive-type differential pair transistors connected with said second active load.

12. A liquid crystal display apparatus, comprising:

said driver for a liquid crystal display panel according to claim 1;

a digital-analog converter configured to output a reference voltage outputted from a gradation voltage generating circuit to said driver based on a display signal; and a display panel comprising a pixel capacity which is driven with said single end signal from said driver based on an output of said digital-analog converter.

* * * * *